(12) United States Patent
Yassin et al.

(10) Patent No.: US 10,931,784 B2
(45) Date of Patent: Feb. 23, 2021

(54) FLEXIBLE TRIGGERING OF TRIGGERED CODE

(71) Applicant: Microsoft Technology Licensing, LLC, Redmond, WA (US)

(72) Inventors: Hesham Yassin, Haifa (IL); Tamer Salman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 16/390,997

(22) Filed: Apr. 22, 2019

(65) Prior Publication Data

US 2020/0336566 A1 Oct. 22, 2020

(51) Int. Cl.
| | |
|---|---|
| *H04L 29/08* | (2006.01) |
| *G06F 11/30* | (2006.01) |
| *G06F 11/34* | (2006.01) |
| *H04L 12/24* | (2006.01) |

(52) U.S. Cl.
CPC ........ *H04L 67/327* (2013.01); *G06F 11/3006* (2013.01); *G06F 11/3495* (2013.01); *H04L 67/10* (2013.01); *H04L 41/5045* (2013.01)

(58) Field of Classification Search
CPC ... H04L 67/327; H04L 67/10; H04L 41/5045; G06F 11/3495; G06F 11/3006
USPC ........................................................ 709/224
See application file for complete search history.

(56) References Cited

U.S. PATENT DOCUMENTS

| | | | |
|---|---|---|---|
| 2018/0101403 A1 | 4/2018 | Baldini Soares et al. | |
| 2018/0341502 A1* | 11/2018 | Rabasa | .................. G06F 9/453 |
| 2019/0042867 A1* | 2/2019 | Chen | ...................... G06N 5/022 |
| 2020/0097961 A1* | 3/2020 | Luo | ........................ H04L 9/0637 |

FOREIGN PATENT DOCUMENTS

WO 2019025944 A1 2/2019

OTHER PUBLICATIONS

Ferreira, et al., "More Sharing, More Benefits? A Study of Library Sharing in Container-Based Infrastructures", in Proceedings of the 23rd International Conference on Parallel and Distributed Computing, Aug. 28, 2017, pp. 358-371.
"International Search Report and Written Opinion Issued in PCT Application No. PCT/US20/023036", dated May 27, 2020, 14 Pages.

* cited by examiner

*Primary Examiner* — Tu T Nguyen
(74) *Attorney, Agent, or Firm* — Fiala & Weaver P.L.L.C.

(57) ABSTRACT

Methods, systems, and computer program products are described herein for flexible triggering of triggered code (e.g. cloud functions). Flexible triggering may reduce costs, for example, by adjusting triggered code execution to avoid resource scale out (e.g. additional resources and/or power consumption). A specified (e.g. preferred) execution trigger may be modified or replaced, for example, by a flexible trigger configured to provide variable triggering. Triggering may be varied, for example, based on the status of one or more monitored resources in an execution environment. Variable triggering may be constrained by a time window (e.g. before, during and/or after a specified trigger). Flexible triggers may be specified (e.g. trigger type, parameters and constraints), for example, in service level agreements, by tenants and/or by cloud providers.

20 Claims, 5 Drawing Sheets

FLEXIBLE TRIGGERING OF TRIGGERED CODE

BACKGROUND

Microsoft Azure® is an example of a cloud computing service. Cloud computing is a form of network-accessible computing that shares private and/or public computer processing resources and data over one or more networks (e.g. the Internet). Cloud computing may provide on-demand access to a shared pool of configurable computing resources, such as computer networks, servers, storage, applications, services, virtual machines and/or containers. Cloud services may include, for example, infrastructure as a service (IaaS), platform as a service (PaaS), software as a service (SaaS), Backend as a service (BaaS), serverless computing and/or function as a service (FaaS). A cloud service provider may provide service to a customer (e.g. tenant) under a service level agreement (SLA), which may specify performance guarantees, a maximum number of resources that may be allocated to the tenant and associated costs. Cloud service costs may be associated with peak usage (e.g. maximum scale out) of resources to accomplish computing tasks, whether a maximum number of resources are used ad hoc or reserved by a tenant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for flexible triggering of triggered code (e.g. cloud functions). Flexible triggering may reduce costs, for example, by adjusting triggered code execution to avoid resource scale out (e.g. additional resources and/or power consumption). A specified (e.g. preferred) execution trigger may be modified or replaced, for example, by a flexible trigger configured to provide variable triggering. Triggering may be varied, for example, based on the status of one or more monitored resources in an execution environment. Variable triggering may be constrained by a time window (e.g. before, during and/or after a specified trigger). Flexible triggers may be specified (e.g. trigger type, parameters and constraints), for example, in service level agreements, by tenants and/or by cloud providers.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
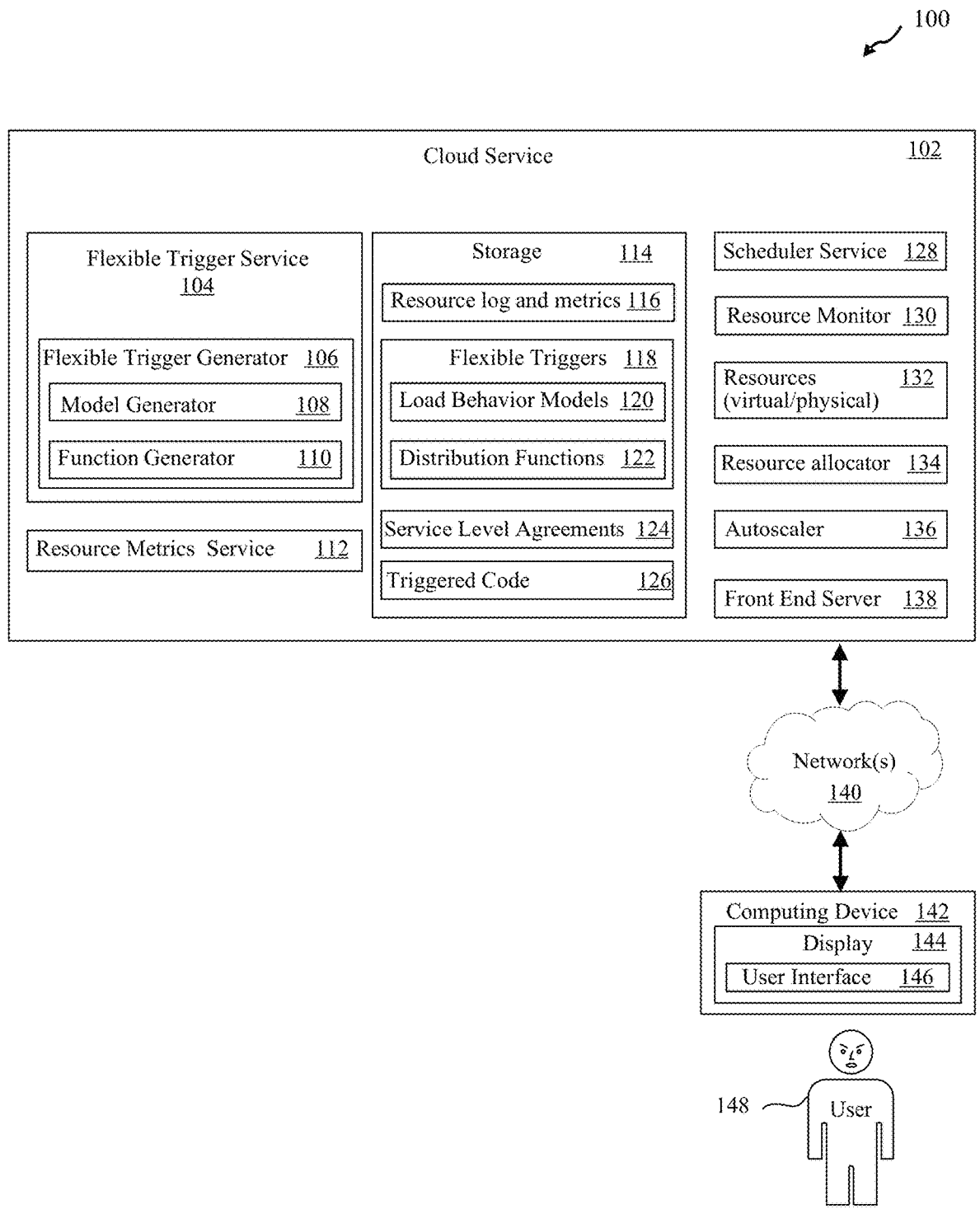
FIG. 1 is a block diagram of an example system for flexible triggering of triggered code in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

Each embodiment is presented as an example among many possible examples of the subject matter disclosed and/or claimed herein. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Flexible Triggering of Triggered Code

Cloud computing costs may increase concomitant with resources utilized or reserved. Increased loading may lead to resource scale out and increased costs. Code (e.g. functions in a serverless computing environment) may be triggered with or without regard to loading and cost. At least some code may be suitable for flexible execution to reduce loading and cost. In an example, execution of periodically executed functions may be adjusted or varied without any significant impact on objectives fulfilled by code execution. In an example, triggered code execution may be varied by a percentage or other portion of an execution period, such as seconds, minutes or hours before and/or after a specified trigger, for example, to reduce loading or cost (e.g. by avoiding or minimizing a magnitude and/or duration of scale out). This may conserve cloud resources and reduce costs. Flexible triggering may optimize code execution timing, for example, to minimize load and/or cost.

Methods, systems, and computer program products are described herein for flexible triggering of triggered code (e.g. cloud functions). Flexible triggering may reduce costs, for example, by adjusting triggered code execution to avoid resource scale out (e.g. additional resources and/or power consumption). A specified (e.g. preferred) execution trigger may be modified or replaced, for example, by a flexible trigger configured to provide variable triggering. Triggering may be varied, for example, based on the status of one or more monitored resources in an execution environment. Variable triggering may be constrained by a time window (e.g. before, during and/or after a specified trigger). Flexible triggers may be specified (e.g. trigger type, parameters and constraints), for example, in service level agreements, by tenants and/or by cloud providers.

Flexible triggering of triggered code may be implemented in any computing environment (e.g. where resource loading may be difficult to predict at any given time). In an example, flexible triggering may be a service provided by a cloud provider and/or may be implemented by customers. Cloud functions may access hosting infrastructure to monitor one or more parameters in an execution environment. Customers may implement flexible triggering of triggered functions (e.g. to avoid scale out costs) with or without support by cloud service 102.

A. Example Flexible Triggering System

FIG. 1 is a block diagram of an example system 100 for flexible triggering of triggered code in accordance with an example embodiment. As shown in FIG. 1, example system 100 may comprise cloud service 102 and computing device 142 communicatively coupled via one or more networks 140. System 100 is one of many possible example implementations of flexible triggering of triggered code.

User 148 may represent, for example, a customer or tenant of cloud service 102. A tenant may comprise a group of one or more users (e.g. employees of a customer) who have access to cloud service 102. User 148 may interact with computing device 142 to create or edit code, create or edit triggers for the code and perform other tasks (e.g. monitor cloud service execution of code). Code may comprise any type of computer-executable instructions (e.g. a program, source code, compiled code, machine code, interpreted code, procedure, script, function, service, application, software and so on).

Computing device 142 may be any type of stationary or mobile computing device, including a mobile computer or mobile computing device (e.g. Microsoft® Surface® device, laptop computer, notebook computer, tablet computer, such as an Apple iPad™ netbook), a wearable computing device (e.g. head-mounted device including smart glasses, such as Google® Glass™), or a stationary computing device, such as a desktop computer or PC (personal computer).

Figure 6:
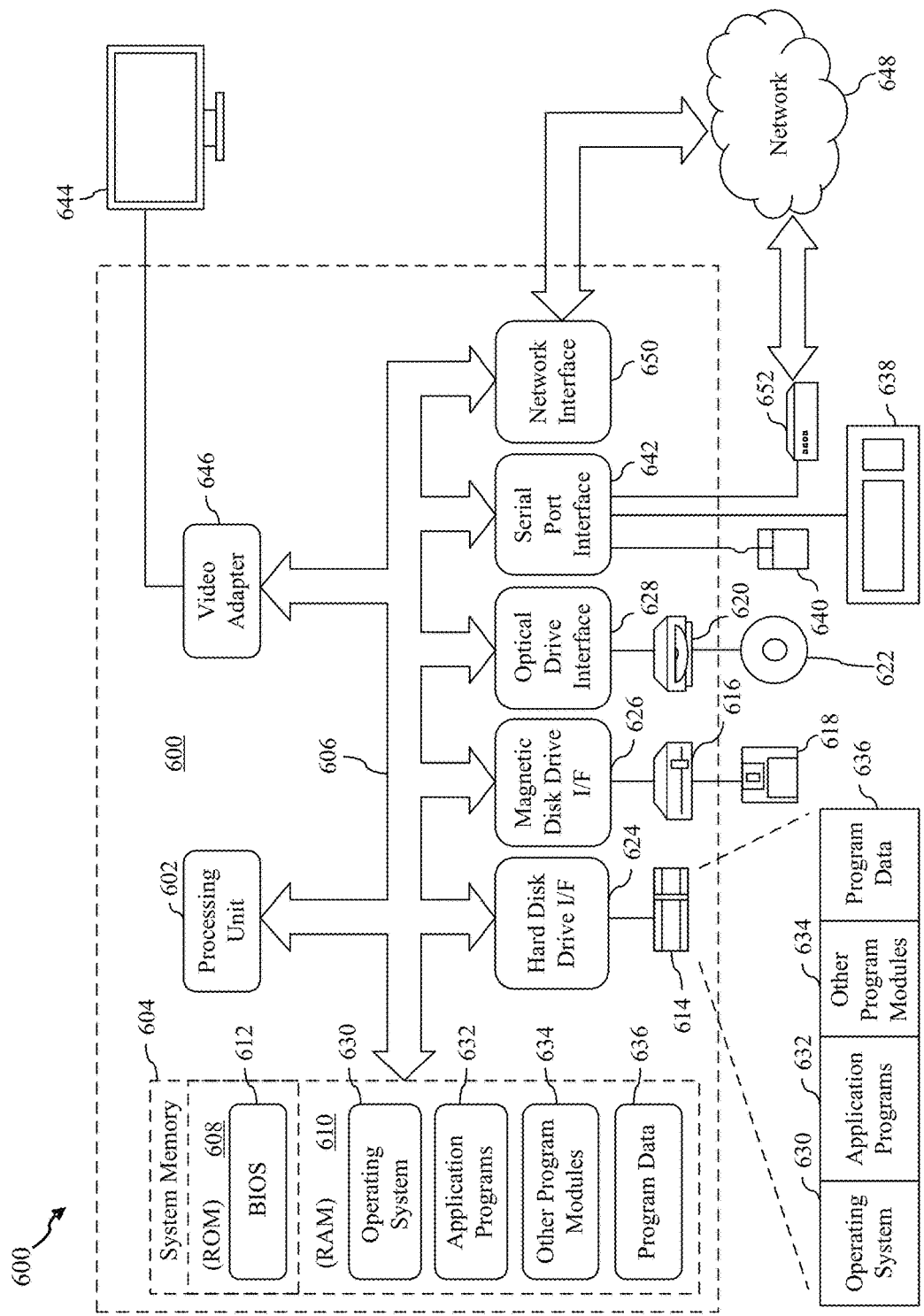
FIG. 6 is a block diagram of an example computing device that may be used to implement embodiments.

Computing device 142 may comprise a display 144, among other features, e.g., as presented by example in FIG. 6. Display 144 may display a wide variety of interactive interfaces to user 148, such as a cloud service user interface 146. User 148 may access cloud service user interface 146, for example, by interacting with an application (e.g. Web browser application) executed by computing device 142. A user may provide or select a network address (e.g. a uniform resource locator) for cloud service 102. Front end server 138 may, for example, provide a login webpage (e.g. cloud service user interface 146) for computing device 142 to render on display 144. Front end server 138 may, for example following login, provide a web service webpage (e.g. cloud service user interface 146) for computing device 142 to render on display 144.

User 148 may provide code and associated information (e.g. specified trigger, flexible trigger and/or parameters therefor) to cloud service 102, for example, by using cloud service user interface 146 to upload the code and/or associated information to cloud service 102, e.g., via network(s) 140. Cloud service 102 (e.g. front end server 138) may receive code and associated information provided by computing device 142. Front end server 138 may store code and associated information in storage 114 (e.g., cloud storage), for example, as triggered code 126. Cloud service 102 may process code and associated information, for example, as described below.

Cloud service 102 and computing device 142 may be communicatively coupled via network(s) 140. Network(s) 140 may comprise one or more communication links of any type between cloud service 102 and computing device 142. In an example, network(s) 140 may comprise one or more wired and/or wireless, public, private and/or hybrid networks, such as local area networks (LANs), wide area networks (WANs), enterprise networks, the Internet, etc. In an example, network(s) 140 may comprise a dedicated communication link.

Cloud service 102 may comprise any type(s) of cloud service, e.g., IaaS, PaaS, SaaS, BaaS, FaaS and so on. Cloud service 102 may be implemented by any number and type of computing devices. Cloud service 102 may comprise a private, public and/or hybrid cloud. Cloud service components are presented by way of non-limiting example. Components may be implemented on one or computing devices. Component functionality may be merged or split in a variety of implementations.

Front end server 138 may provide, for example, cloud service user interface 146 and application programming interfaces (APIs) for customer service requests, manage data and/or computing resources, etc. In an example, front end server 138 may provide cloud service user interface 146 to computing device 142 to present to user 148 on display 144. Front end server 138 may receive, for example, customer code (e.g. triggered code 126), specified triggers, service level agreements (SLAs) 124 and any associated flexible triggering parameters and cause such information to be stored in storage 114. Front end server 138 may communicate with storage 114, for example, to store SLAs 124 and triggered code 126. Front end server 138 may communicate with flexible trigger service 104, for example, to notify flexible trigger service 104 to select, configure and instantiate a flexible trigger for triggered code that tenant, cloud service and/or SLA may indicate is a candidate for flexible triggering. Front end server 138 may communicate with scheduler service 128, for example, to schedule execution of customer code with a specified trigger or flexible trigger. Front end server 138 may communicate with autoscaler 136, for example, to provide autoscaling policies specified by a customer (e.g. via cloud service user interface 146).

Autoscaler 136 may, for example, automatically adjust the capacity of one or more data and/or computing resources (e.g. resources 132) for a tenant's computing tasks. Autoscaler 136 may increase (scale out) or decrease (scale in) the capacities of one or more resources in response to varying loads placed on the one or more resources. Autoscaling may be implemented, for example, to comply with performance levels specified in a tenant's SLA. Autoscaler 136 may communicate with scheduler service 128 and resource metrics service 112, for example, to receive and analyze current and prospective loading to make scaling decisions. Autoscaler 136 may communicate with resource allocator 134, for example, to allocate resources 132 in accordance with autoscaling policies.

Resource allocator 134 may allocate resources 132. Resource allocator 134 may scale out or scale in resources 132, for example, by increasing or decreasing the number of instances of one or more resources 132. Resource allocator 134 may communicate with autoscaler 136 and resources 132, for example, to carry out resource scaling directed by autoscaler 136.

Resources 132 may comprise physical and/or virtual resources. Resources may include, for example, computer networks, servers, routers, storage, applications, services, virtual machines, containers, etc. Physical resources may be centralized (e.g. clustered) and/or distributed. In an example, one or more resource clusters may be co-located (e.g. housed in one or more nearby buildings with associated components, such as backup power supplies, redundant data communications, environmental controls, etc.) to form a datacenter. Resources 132 may comprise one or more (e.g. globally distributed) datacenters.

Resource monitor 130 may generate, collect and/or store information about instantiated resources (e.g. resource log and metrics 116). Resource monitor 130 may communicate with resource metrics service 112, for example, to provide monitored resource metrics for storage and/or analyses. In an example, resource monitor 130 may utilize agents associated with resources to monitor and/or collect resource information. A (e.g. each) resource instance may have, for example, an associated agent application or service that generates resource information (e.g. metric and/or log data) for the associated resource.

Scheduler service 128 (e.g. Microsoft Azure® Scheduler) may schedule triggered code 126 for execution utilizing one or more resources 132. Scheduler service 128 may communicate with front end server 138, for example, to receive scheduling information received by front end server 138. Scheduler service 128 may communicate with flexible trigger service 104, for example, to associate a flexible trigger with triggered code 126 in lieu of a specified trigger. Scheduler service 128 may communicate with resources 132 (e.g. resource instances), for example, to schedule a service (e.g. execute customer code 126 in response to a specified trigger or a flexible trigger).

Flexible trigger service 104 may provide flexible triggering of triggered code 126. Flexible trigger service 104 may, for example, generate flexible triggers, deploy (e.g. select, configure and instantiate) flexible triggers for triggered code 126, etc. Flexible trigger service 104 may receive an indication (e.g. from front end server 138) that triggered code 126 received from tenant (e.g. user 148 via computing device 142) is a candidate for flexible triggering. Flexible triggering service 104 may interpret triggered code 126 (including associated information), SLA 124 and/or cloud service 102 policies to determine which type of flexible trigger to select, how to configure the flexible trigger and when to instantiate it.

Flexible trigger service 104 (e.g. flexible trigger generator 106) may generate a variety of flexible triggers to deploy based on automated and/or manual selection. A flexible trigger based on a specified trigger may comprise, for example, something additional or alternative to the specified trigger, e.g., one or more alternative or cumulative events, temporal and/or otherwise, with or without one or more conditions or constraints (e.g. time window duration, start time, stop time). A flexible trigger may be based on a specified trigger yet trigger before the specified trigger occurs based on an alternative event or condition (e.g. start of window, decreased resource loading). A flexible trigger may be based on a specified trigger yet wait to trigger after the specified trigger occurs until an additional event or condition occurs (e.g. decreased resource loading or window timeout).

Flexible trigger generator 106 may generate and store one or more types of flexible triggers 118. Flexible trigger generator 106 may comprise one or more generators. In an example, flexible trigger generator 106 may comprise model generator 108 and function generator 110.

Model generator 108 may generate and store, for example, one or more load behavior models 120. For example, model generator 108 may generate one or more models based on one or more execution environment parameters. Model(s) may be stored (e.g. as load behavior models 120) ready for deployment. Flexible trigger service 104 may (e.g. during deployment) configure models with one or more parameters and constraints specified by a tenant, cloud provider, SLA, etc. Model generator 108 may communicate with resource metrics service 112, for example, for resource information to construct one or more models.

In an example, a load behavior model for one or more resources may be constructed by learning from resource log and metrics 116. A model may be ready for deployment, for example, after a learning grace period used to create the model. A model may be tuned and adapted during deployment, for example, by updating resource loading information with more recent loading information and/or by making adjustments based on performance of the model in triggering execution at the most opportune times during a window. A flexible trigger may use a model to predict or identify optimal times to trigger code execution with minimal resource loading (e.g. during a flexible code execution window).

Function generator 110 may generate and store, for example, one or more distribution functions 122. For example, function generator 110 may generate one or more distribution functions based on one or more execution environment parameters associated with one or more trigger event generators. Flexible trigger service 104 may (e.g. during deployment) configure functions with one or more parameters and constraints specified by a tenant, cloud provider, SLA, etc.

In an example, a distribution function may comprise a predefined probability distribution function that assigns a probability of triggering execution at various points in time within a time window based on, for example, a specific load threshold or a relative load improvement threshold for one or more monitored resources in an execution environment. Probabilities of triggering execution may vary over the course of a window. For example, a lesser improvement may not lead to triggering early in a window while it may lead to triggering later in a window. The greater the load improvement, the faster it may trigger execution of code.

Flexible trigger service 104 may deploy specific flexible triggers for triggered code 126, for example, by selecting a (e.g. type of) flexible trigger, configuring it with flexible trigger parameters, e.g., based on information provided by user 148, triggered code 126, cloud service 102, SLA 124, etc. and instantiating the configured flexible trigger. Instantiation may occur, for example, before a flexible trigger window opens.

Figure 2:
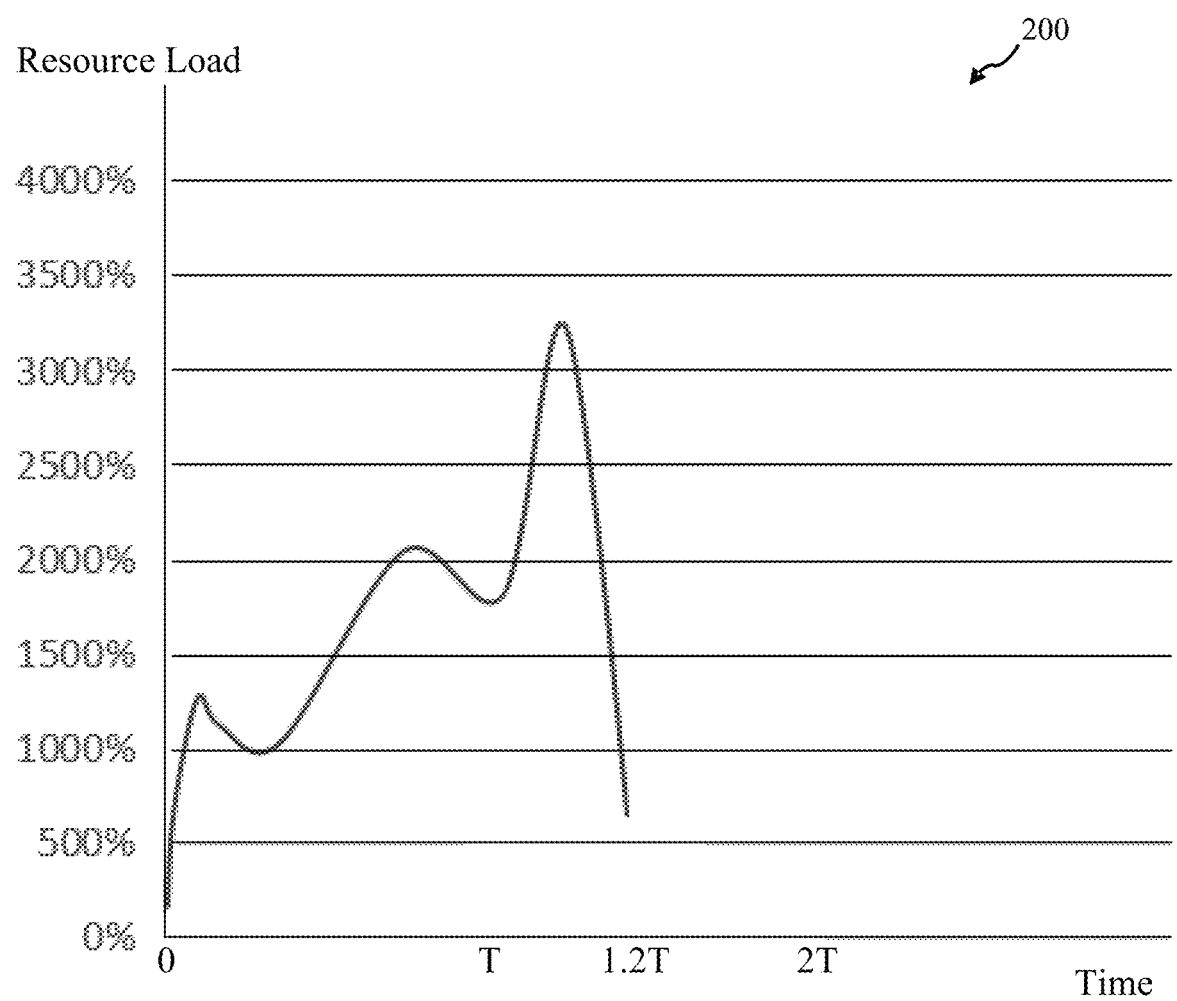
FIG. 2 is a graph of example loading information for a monitored resource that may be used for flexible triggering of code execution in accordance with an example embodiment.

FIG. 2 is a graph 200 of example loading information for a monitored resource that may be used for flexible triggering of code execution in accordance with an example embodiment. FIG. 2 shows an example of resource loading that may be used, for example, to create and/or update a resource load behavior model or otherwise implement flexible triggering of code execution.

An execution trigger specified for (e.g. associated with) code may trigger execution of the code upon the occurrence of a specified event, such as a specific time, a specific message or other predictable or unpredictable event. Triggering execution of code regardless of the state of or consequences for an execution environment may prove costly. Scale out may be required to execute the code, which may incur costs to a tenant and a service provider.

The example shown in FIG. 2 illustrates loading on a monitored resource and code (e.g. an Azure function) associated with a periodic trigger that triggers execution every T seconds (e.g. at time 0, T, 2T). The amount of time to execute the code may be, for example, 1.2T. Between time T and time 1.2T, resource loading peaks because two instances of the code are running simultaneously due to overlapping execution. A tenant and/or cloud provider may benefit from flexible triggering, such as at time 1.2T rather than time T, when resource loading is significantly lower. The example shown in FIG. 2 applies equally to non-periodically triggered code. A tenant and/or cloud provider may benefit from flexible triggering of any triggered code associated with an execution trigger that occurs at time T, assuming the triggered code is a candidate for flexible execution.

Triggered code may be a candidate for flexible triggering, for example, when a trigger deviation would not significantly impact one or more purposes for the specified trigger. In an example, code executed every minute or few minutes or every hour or several hours may be permitted to deviate, respectively, by one or more seconds or one or more minutes while continuing to serve their respective purposes without stringent adherence to specified execution triggers.

A flexible trigger may be implemented, for example, to optimize code execution to serve one or more goals or objectives, such as reducing loading or cost while satisfying a service level specified in an SLA and/or objective(s) for triggered code execution. A flexible trigger may expand a specified trigger to a range, interval or window and trigger execution during the window based on the occurrence one or more events, such as a specific or relative resource load at a specific time in the window or a time indicated by a resource load behavior model. A window may precede a specified trigger, for example, when the specified trigger may be predictable (e.g. specific time(s)). A window may begin upon the occurrence of a specified trigger, for example, when the trigger may be unpredictable. A cloud provider and/or tenant may specify one or more constraints on windows, such as starting time (e.g. specific time or relative to specified trigger, ending time (e.g. specific time or relative to specified trigger), duration, etc.

One or more computing environment parameters (e.g. loading of one or more resources) may be monitored for one or more types of flexible triggers. As shown in FIG. 2, the graph of resource loading may be real-time or historical. One or more types of flexible triggers may utilize historical and/or real-time parameter values or states.

Flexible trigger generator 106 may, for example, generate a model-based flexible trigger. For example, model generator 108 may generate one or more model-based flexible triggers based on one or more execution environment parameters. Model-based flexible triggers (e.g. load behavior models 120) may generate flexible execution events based on behavior predicted by a model. Flexible trigger service 104 may configure models with one or more parameters and constraints specified by a tenant, cloud provider, SLA, etc.

In an example, a flexible trigger may operate based on one or more models that model behavior of one or more parameters of interest. In an example, a load behavior model for one or more resources may be constructed by learning from historical execution and/or a real-time execution learning period for resource load behavior (e.g. as shown in FIG. 2). A model may be deployed, for example, after a learning grace period. A model may assist a flexible trigger with identification of local minima for resource load magnitudes, e.g., to optimize flexible triggering. A model may be tuned and adapted during deployment, for example, by updating resource loading information with more recent loading information and/or by making adjustments based on performance of the model in triggering execution at the most opportune times during a window. In an example, it may be observed that, increasingly, the beginning of a code execution window places significantly heavier loads on infrastructure compared to the end of the code execution window. A model may be tuned, for example, to support selection or generation of a trigger event near the end of the window instead of the beginning of the window.

Figure 3:
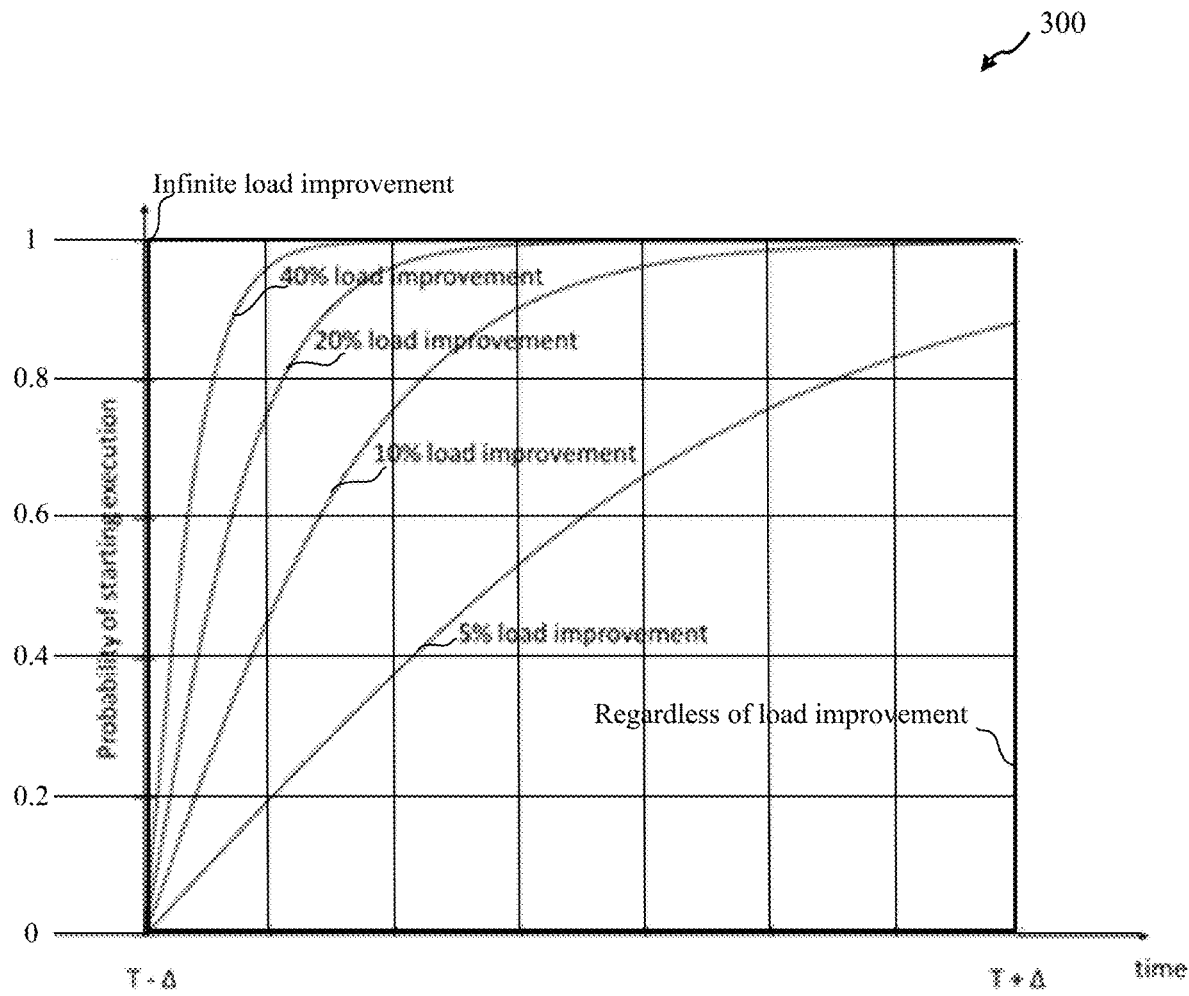
FIG. 3 is a graph of an example flexible trigger distribution function in accordance with an example embodiment.

FIG. 3 is a graph 300 of an example flexible trigger distribution function in accordance with an example embodiment. FIG. 3 shows an example of a predefined probability distribution function that assigns a probability of triggering execution at various points in time within a window based on load improvement for one or more monitored resources in an execution environment.

Flexible trigger generator 106 may, for example, generate a distribution function. For example, function generator 110 may generate one or more distribution functions based on one or more execution environment parameters associated with one or more trigger event generators. Distribution functions 122 may be stored as flexible triggers 118. Flexible trigger service 104 may configure functions with one or more parameters and constraints specified by a tenant, cloud provider, SLA, etc.

A flexible trigger may comprise, for example, a specified trigger with a specified deviation centered or offset relative to the specified trigger, creating a window (e.g. range, interval) based on the specified trigger. A deviation may be specified, for example, additively (e.g. trigger +/−) or multiplicatively (e.g. as a multiple of a trigger). A flexible trigger may comprise a loop that compares an updated state or value of one or more parameters to a previous state or value or to one or more thresholds. A state or value or a relative change in state or value may be compared to one or more thresholds to determine whether to generate a flexible trigger event. A flexible trigger may generate a flexible execution event, for example, when loading on one or more monitored resources drops below a threshold. A threshold may vary based on, for example, the time remaining in a time window. A flexible trigger may generate a trigger event based on any one or more conditions satisfying any one or more thresholds. Code may be associated with one or more flexible triggers. A flexible trigger may generate a trigger event at the same time or at a different time than a specified trigger would generate a trigger event.

In an example, an execution trigger specified for a cloud function may be periodic, triggering execution of the cloud function at predictable times in a fixed repetition. A flexible trigger may be associated with the cloud function that permits one or more (e.g. all) periodic triggers to vary by a percentage or other deviation before and/or after the periodic trigger (e.g. +/− interval), creating a constrained execution time range or window based on the specified trigger.

In an example, a specified trigger time T may be rendered flexible, for example, by expanding triggering to a window based on a specified trigger time T with a maximum deviation of $\Delta$. The window may be centered, for example, beginning at time T−$\Delta$ and ending at time T+$\Delta$. Resource loading may be monitored during the window. A relative comparison may be made between load measurements. In an example, load improvement may be determined by comparing a current load measurement to a load measurement at the start of the window. In an (e.g. alternative) example, load improvement may be determined by comparing a current load measurement to a consecutive, preceding measurement. A probability of 1 equates to triggering execution of code.

Probabilities of triggering execution may vary over the course of a window. For example, a lesser improvement may not lead to triggering early in a window while it may lead to triggering later in a window. The greater the load improvement, the faster it may trigger execution of code. As shown by the example in FIG. 3, an infinite load improvement may immediately trigger execution of code at the start of and through the window. Lesser improvements may result in triggering later in the window. A 5% load improvement may be deemed too insignificant to trigger execution in the window. As indicated by "regardless of load improvement" in FIG. 3, code execution may be triggered regardless of load improvement, for example, if a trigger hasn't been generated based on a load improvement by the end of the window. For clarity, FIG. 3 only shows flexible triggering for a few discrete load improvements. A distribution function may provide continuous triggering, making a decision based on any load improvement for any given time in a window. For example, triggering probabilities for load improvements between infinite and 40% may be plotted between the plots for infinite and 40% load improvements.

Many other examples may be implemented. In an example, flexible triggering functions may be based on any one or more parameters, whether independent magnitudes or relative comparisons.

B. Example Flexible Triggering Methods

Figure 4:
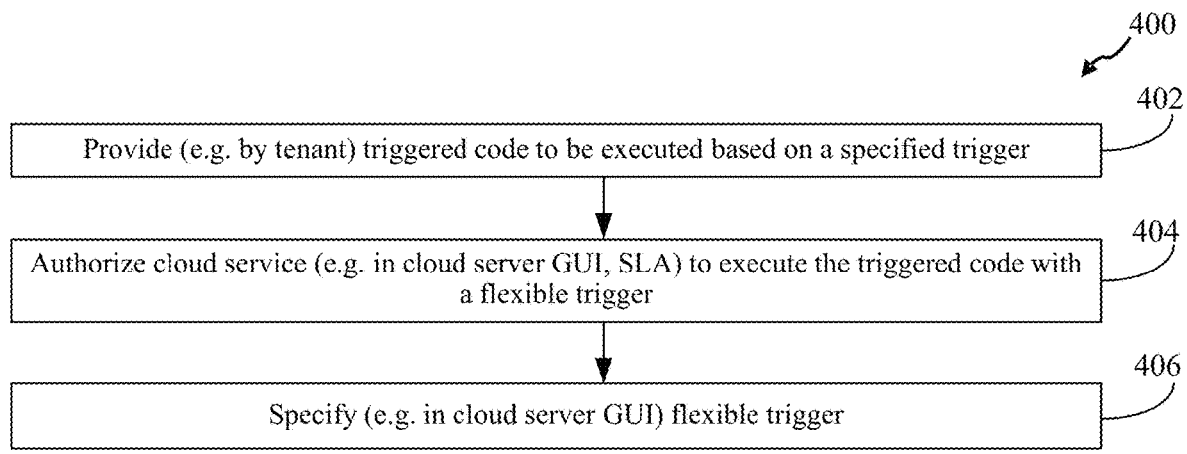
FIG. 4 is a flowchart of an example method for providing triggered code and flexible trigger parameters in accordance with an example embodiment.

Embodiments may also be implemented in processes or methods. For example, FIG. 4 is a flowchart of an example method 400 for providing triggered code and flexible trigger parameters in accordance with an example embodiment. Embodiments disclosed herein and other embodiments may operate in accordance with method 400. Method 400 comprises steps 402 to 406. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Method 400 begins with step 402. In step 402, triggered code to be executed based on a specified trigger may be provided (e.g. by a tenant). For example, as shown in FIG. 1, user 148 may create code using computing device 142. User 148 may upload the code and may specify a trigger, for example, by using computing device 142 to interact with cloud service user interface 146 provided by front end server 138.

At step 404, a cloud service may be authorized (e.g. in cloud server GUI, SLA) to execute the triggered code with a flexible trigger. For example, as shown in FIG. 1, user 148 may indicate triggered code is a candidate for flexible triggering, e.g., by using computing device 142 to interact with cloud service user interface 146 provided by front end server 138. Cloud service user interface 146 may, for example, query user 148 whether code is associated with a trigger and whether it is a candidate for flexible triggering. In another example, a tenant SLA or code configuration may indicate triggered code is a candidate for flexible triggering.

At step 406, a flexible trigger may be specified, for example, by a user, cloud service and/or an SLA. Flexible trigger specification may include, for example, a type of flexible trigger, a permissible deviation or time window (e.g. duration, centered or offset on specified trigger), trigger event generation logic, parameter(s) (e.g. resource loading) in trigger event logic, etc. A user may, for example, select a default or defer to cloud service 102. For example, as shown in FIG. 1, user 148 may specify a flexible trigger, e.g., by using computing device 142 to interact with cloud service user interface 146 provided by front end server 138. Cloud service user interface 146 may, for example, query user 148 about various details to generate a flexible trigger.

Figure 5:
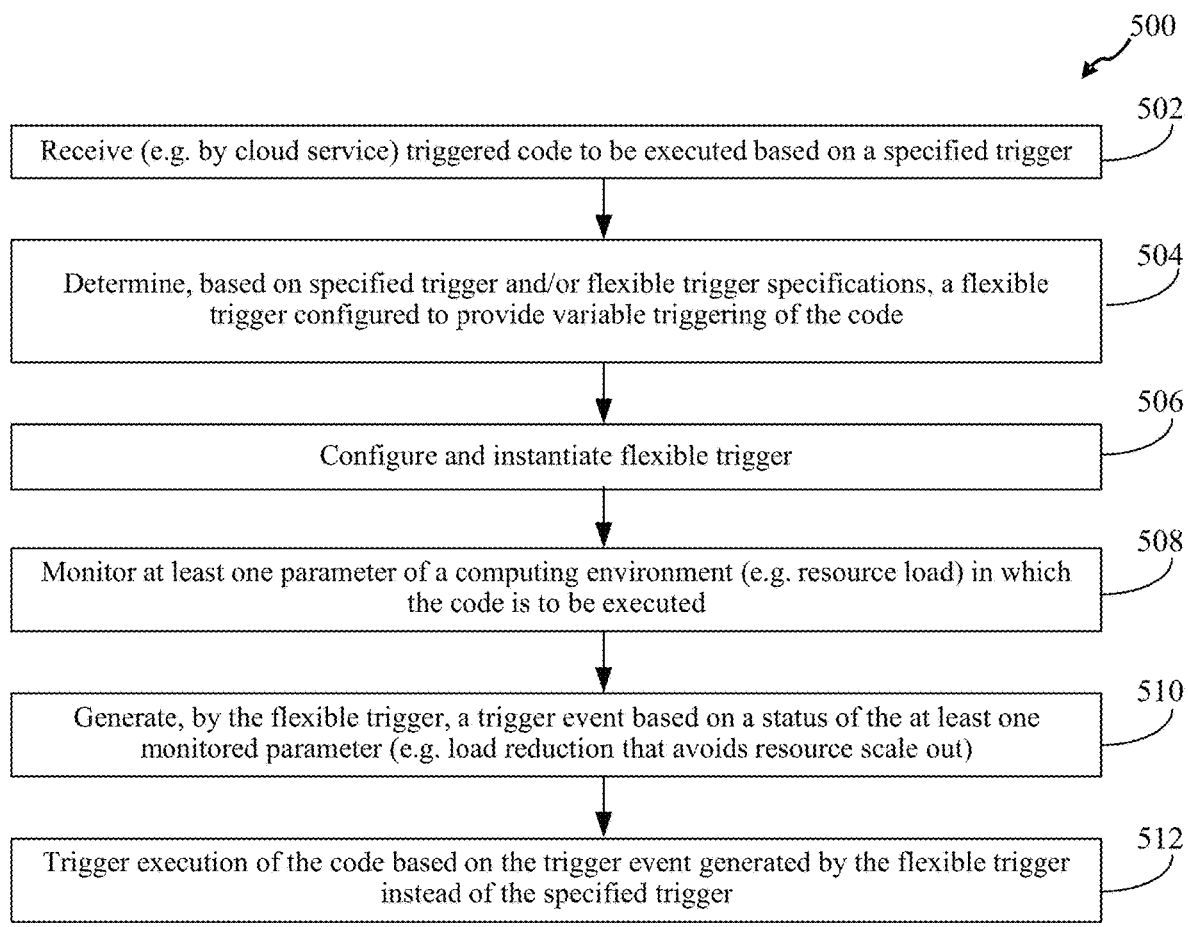
FIG. 5 is a flowchart of an example method for flexible triggering of triggered code in accordance with an example embodiment.

FIG. 5 is a flowchart of an example method for flexible triggering of triggered code in accordance with an example embodiment. Embodiments disclosed herein and other embodiments may operate in accordance with method 500. Method 500 comprises steps 502 to 512. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Method 500 begins with step 502. In step 502, triggered code may be received (e.g. by cloud service) for execution based on a specified trigger. For example, as shown in FIG. 1, front end server 138 may receive triggered code provided by computing device 142 via network(s) 140.

At step 504, a flexible trigger configured to provide variable triggering of the code may be determined based on the specified trigger and/or flexible trigger parameters. For example, as shown in FIG. 1, flexible trigger service 104 may select a flexible trigger from flexible triggers 118, for example, based on the trigger specified for triggered code 126 and/or flexible trigger information or specification that may be provided by tenant (e.g. user 148), cloud service 102 and/or SLA 124.

At step 506, a flexible trigger may be configured and instantiated. For example, as shown in FIG. 1, flexible trigger service 104 may configure the flexible trigger it selected in step 504 based on, flexible trigger specifications provided by tenant, cloud service 102 and/or SLA. In an example, flexible trigger service 104 may configure distribution function 122 with a permissible deviation or time window (e.g. duration, centered or offset on specified trigger), trigger event generation logic, parameter(s) (e.g. resource loading) in trigger event logic, etc. Flexible trigger service 104 and scheduler service 128 may, for example, cooperate to instantiate the flexible trigger for triggered code 126.

At step 508, at least one parameter of a computing environment (e.g. resource load) in which the code is to be executed may be monitored. For example, as shown in FIG. 1, resource monitor 130 may monitor one or more resources and provide resource information to resource metrics service 112 for storage in storage 112 as resource metrics 116. Resource metrics service 112 may be called (e.g. by a flexible trigger instance) to access and provide relevant resource information for processing by a flexible trigger.

At step 510, a trigger event may be generated by a (e.g. the instantiated) flexible trigger based on a status of the at least one monitored parameter (e.g. load reduction that avoids resource scale out). For example, as shown in FIG. 3, an instantiated distribution function may generate a flexible trigger event based on a calculated load improvement of one or more monitored resources relevant to the flexible trigger. The flexible trigger event may be provided, for example, to code execution scheduler service 128 and/or to one or more resources 132 for execution of triggered code 126.

At step 512, execution of triggered code 126 may be triggered based on the trigger event generated by the instantiated flexible trigger instead of the specified trigger. For example, as shown in FIG. 1, scheduler service 128 may provide the flexible trigger event to one or more resources 132, which execute triggered code 126 based on the trigger event generated by the instantiated flexible trigger instead of the specified trigger.

III. Example Computing Device Embodiment

Systems described herein, may be implemented together in an SoC. In an example, an SoC may include an integrated circuit chip comprising one or more of a processor (e.g. central processing unit (CPU), microcontroller, microprocessor, digital signal processor (DSP)), memory, one or more communication interfaces, and/or further circuits, and may (e.g. optionally) execute received program code and/or include embedded firmware to perform functions.

FIG. 6 is a block diagram of an example computing device that may be used to implement embodiments. FIG. 6 depicts one of many examples of a computing device in which embodiments may be implemented. The description of computing device 600 provided herein is provided for purposes of illustration, and is not intended to be limiting. Embodiments may be implemented in further types of computer systems, as would be known to persons skilled in the relevant art(s).

As shown in FIG. 6, computing device 600 may include one or more processors, referred to as processor circuit 602, a system memory 604, and a bus 606 that couples various system components including system memory 604 to processor circuit 602. Processor circuit 602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 630, one or more application programs 632, other programs 634, and program data 636. Application programs 632 or other programs 634 may include, for example, computer program logic (e.g., computer program code or instructions) for implementing the systems described herein.

A user may enter commands and information into the computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to, or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to generally refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nanotechnology-based storage devices, and further types of physical/tangible hardware storage media (including system memory 604 of FIG. 6). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 652, or any other interface type. Such computer programs, when executed or loaded by an application, enable computing device 600 to implement features of embodiments discussed herein. Accordingly, such computer programs represent controllers of the computing device 600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

Methods, systems, and computer program products are described herein for flexible triggering of triggered code (e.g. cloud functions). Flexible triggering may reduce costs, for example, by adjusting triggered code execution to avoid resource scale out (e.g. additional resources and/or power consumption). A specified (e.g. preferred) execution trigger may be modified or replaced, for example, by a flexible trigger configured to provide variable triggering. Triggering may be varied, for example, based on the status of one or more monitored resources in an execution environment. Variable triggering may be constrained by a time window (e.g. before, during and/or after a specified trigger). Flexible triggers may be specified (e.g. trigger type, parameters and constraints), for example, in service level agreements, by tenants and/or by cloud providers.

In an example, a method performed by at least one computing device may comprise, for example, receiving, by the at least one computing device, code to be executed based on a specified trigger; determining, based on the specified trigger, a flexible trigger configured to provide variable triggering of the code; and triggering execution of the code based on the flexible trigger instead of the specified trigger.

In an example, the method may further comprise, for example, constraining the flexible trigger to a time window based on the specified trigger.

In an example, the time window may comprise, for example, time before the specified trigger.

In an example, the method may further comprise, for example, monitoring at least one parameter of a computing environment in which the code is to be executed; and generating, by the flexible trigger, a trigger event based on a status of the at least one parameter, wherein the triggering of the execution is based on the trigger event.

In an example, the at least one parameter may comprise, for example, availability or loading of a resource in the computing environment.

In an example, the flexible trigger may comprise, for example, a predefined probability distribution function that triggers execution of the computer code earlier in the time window for a greater reduction in resource load than for a lesser reduction in resource load.

In an example, the method may further comprise, for example, determining the flexible trigger based on a load behavior model of the monitored resource.

In an example, the at least one computing device may comprise, for example, a cloud computing environment.

In an example, a system may comprise, for example, a serverless computing environment configured to: receive a function to be executed based on a specified trigger; and trigger execution of the function based on a flexible trigger instead of the specified trigger, the flexible trigger being based on a status of at least one monitored resource of the serverless computing environment.

In an example, the system may further comprise, for example, the serverless computing environment configured to: constrain the flexible trigger to a time window based on a maximum deviation from the specified trigger.

In an example, the time window may comprise, for example, time before the specified trigger.

In an example, the system may further comprise, for example, the flexible trigger configured to: trigger execution of the function at a time that avoids scaling out the at least one monitored resource.

In an example, the flexible trigger may trigger the execution of the function during the time window based on, for example, a load behavior model of the at least one monitored resource.

In an example, the flexible trigger may trigger the execution of the function during the time window, for example, based on a distribution function during the time window.

In an example, a computer-readable storage medium having program instructions recorded thereon may, when executed by at least one processing circuit, perform a method comprising, for example: receiving code to be executed based on a specified trigger; triggering execution of the code based on a flexible trigger instead of the specified trigger, the flexible trigger being constrained by a time window based on maximum deviation from the specified trigger.

In an example, the time window may comprise, for example, time before the specified trigger.

In an example, triggering execution of the code based on the flexible trigger may comprise, for example: monitoring a resource in a computing environment in which the computer code is to be executed; and triggering the execution of the code based on a loading of the monitored resource.

In an example, the flexible trigger may comprise, for example, a predefined probability distribution function that triggers execution of the computer code earlier in the time window for a greater reduction in resource load than for a lesser reduction in resource load.

In an example, the flexible trigger may comprise, for example, a load behavior model of the monitored resource.

In an example, the computing environment may comprise, for example, a serverless computing environment, the code comprises a function, and the specified trigger comprises a periodic time.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by at least one computing device, comprising:
    receiving, by the at least one computing device, code to be executed based on a specified trigger;
    determining, based on the specified trigger, a flexible trigger configured to provide variable triggering of the code and that activates within a time window, the time window being based on the specified trigger and comprising time before the specified trigger; and
    triggering execution of the code within the time window based on the flexible trigger instead of the specified trigger.

2. The method of claim 1, further comprising:
    activating the flexible trigger before a specified time of the specified trigger.

3. The method of claim 2, further comprising:
    executing the code before the specified time of the specified trigger.

4. The method of claim 2, further comprising:
    monitoring at least one parameter of a computing environment in which the code is to be executed; and
    generating, by the flexible trigger, a trigger event based on a status of the at least one parameter, wherein the triggering of the execution of the code is based on the trigger event.

5. The method of claim 4, wherein the at least one parameter comprises availability or loading of a resource in the computing environment.

6. The method of claim 5, wherein the flexible trigger comprises a predefined probability distribution function that triggers execution of the code earlier in the time window for a greater reduction in resource load than for a lesser reduction in resource load.

7. The method of claim 5, further comprising:
    determining the flexible trigger based on a load behavior model of the monitored resource.

8. The method of claim 7, wherein the at least one computing device comprises a cloud computing environment.

9. A system, comprising:
    a serverless computing environment configured to:
        receive a function to be executed based on a specified trigger; and
        trigger execution of the function based on a flexible trigger instead of the specified trigger, the flexible trigger activating within a time window and being based on a status of at least one monitored resource of the serverless computing environment, the time window comprising time before the specified trigger.

10. The system of claim 9, wherein the serverless computing environment is configured to:
    generate the time window based on a maximum deviation from the specified trigger.

11. The system of claim 10, wherein the flexible trigger is configured to trigger execution of the function at a time that avoids scaling out the at least one monitored resource.

12. The system of claim 11, wherein the flexible trigger triggers the execution of the function during the time window based on a load behavior model of the at least one monitored resource.

13. The system of claim 11, wherein the flexible trigger triggers the execution of the function during the time window based on a distribution function.

14. The system of claim 9, wherein the serverless computing environment is configured to:
    execute the function before the specified time of the specified trigger.

15. A computer-readable storage medium having program instructions recorded thereon that, when executed by at least one processing circuit, perform a method, the method comprising:
    receiving code to be executed based on a specified trigger; and
    triggering execution of the code based on a flexible trigger instead of the specified trigger, the flexible trigger activating within a time window based on maximum deviation from the specified trigger, the time window comprising time before the specified trigger.

16. The computer-readable storage medium of claim 15, wherein the flexible trigger activating is performed before a specified time of the specified trigger.

17. The computer-readable storage medium of claim 15, wherein triggering execution of the code based on the flexible trigger comprises:
    monitoring a resource in a computing environment in which the computer code is to be executed; and
    triggering the execution of the code based on a loading of the monitored resource.

18. The computer-readable storage medium of claim 17, wherein the flexible trigger comprises a predefined probability distribution function that triggers execution of the code earlier in the time window for a greater reduction in resource load than for a lesser reduction in resource load.

19. The computer-readable storage medium of claim 17, wherein the flexible trigger comprises a load behavior model of the monitored resource.

20. The computer-readable storage medium of claim 15, wherein the computing environment comprises a serverless computing environment, the code comprises a function, and the specified trigger comprises a periodic time.

* * * * *